US006754081B2

(12) United States Patent
Rude et al.

(10) Patent No.: US 6,754,081 B2
(45) Date of Patent: Jun. 22, 2004

(54) POP-UP FRICTION HINGE HAVING MULTIPLE LEVELS OF TORQUE

(76) Inventors: Edward Rude, 8556 Window Latch Way, Columbia, MD (US) 21045; Yury Karfiol, 1960 W. 8th St., Brooklyn, NY (US) 11223; Douglas Collins, 56 Red Fox La., Trumbull, CT (US) 06611

( * ) Notice: Subject to any disclaimer, the term of this patent is extended or adjusted under 35 U.S.C. 154(b) by 0 days.

(21) Appl. No.: 10/345,774

(22) Filed: Jan. 16, 2003

(65) Prior Publication Data

US 2003/0163900 A1 Sep. 4, 2003

Related U.S. Application Data

(60) Provisional application No. 60/350,682, filed on Jan. 22, 2002.

(51) Int. Cl.[7] .................................................. G06F 1/16
(52) U.S. Cl. .......................... 361/725; 16/308; D6/396; 312/223.6
(58) Field of Search ................................ 361/724–727, 361/679–683; 16/299, 308, 322, 342; D6/396, 397; D14/100, 114; 345/173, 179; 312/223.2, 223.6

(56) References Cited

U.S. PATENT DOCUMENTS

| 5,079,799 A | | 1/1992 | Rude et al. ................... 16/342 |
|---|---|---|---|
| 5,231,734 A | | 8/1993 | Rude ........................... 16/342 |
| 5,406,678 A | | 4/1995 | Kaden et al. ................. 16/342 |
| 5,771,540 A | | 6/1998 | Carpenter et al. ............ 16/308 |
| 6,553,625 B2 | * | 4/2003 | Lin et al. ...................... 16/342 |
| 2001/0012197 A1 | * | 8/2001 | O'Neal et al. ............... 361/683 |
| 2002/0064027 A1 | * | 5/2002 | Sasaki et al. ................ 361/700 |
| 2002/0167789 A1 | * | 11/2002 | Novin et al ................. 361/681 |

* cited by examiner

Primary Examiner—Hung Van Duong
(74) Attorney, Agent, or Firm—Jeffrey M. Kaden; Gottlieb, Rackman & Reisman, P.C.

(57) ABSTRACT

A friction hinge system for a laptop computer is provided. The system allows the computer display to move easily from a closed condition toward various operating angular positions while providing a greater torque for maintaining selected angular orientation. The system includes two or more bands wrapped in the same direction about a common shaft as well as a stop features for limiting the angle of rotation of each band relative to the shaft.

13 Claims, 7 Drawing Sheets

POP-UP FRICTION HINGE HAVING MULTIPLE LEVELS OF TORQUE

This application is based on Provisional Application No. 60/350,682, filed Jan. 22, 2002.

BACKGROUND TO THE INVENTION

This invention relates to a friction hinge mechanism used for mounting the displays on laptop computers and other devices. It has significant advantages over hinges of the prior art which can provide only one level of torque. Having a single level of torque poses a problem for present day laptops which have larger and heavier displays but lighter bases, both of which are enabled by recent advances in technology.

The need for different levels of torque can be understood from the following. Low torque is desirable as the laptop is opened so that the base does not have to be held down by the user as the lid is raised. Yet, when the screen is in range of positions for operation of the laptop, higher torque is needed to keep the screen from moving, even when subject to bouncing, as on a train or in a car.

During closing, low torque is permissible, even desirable for ease of motion, until the lid is nearly closed. But then a higher torque is needed to prevent the lid from slamming shut which may cause damage to the fragile elements in the display.

The hinge of our invention can also provide torque to cause the lid to pop-up, an additional feature much sought after by laptop customers, and therefore, by the designers and manufacturers of these devices. Those who supply friction hinges to the laptop industry are often asked for pop-up hinges. That is, hinges that will cause the display to open slightly when the latch is released so that the user can more easily open the computer. Those laptops without this feature often require that the lid be lifted by the user. Releasing a single latch in the center while raising the lid can be awkward. Providing a latch on each side, where the hands must be positioned to raise the lid, increases cost, weight, and complexity. The pop-up feature of our hinge derives from the same components that provide the two-level torque. So no additional components or expense are required to achieve this benefit.

BRIEF DESCRIPTION OF THE INVENTION

There are several techniques employed for producing friction in hinges. The hinge of our invention uses question-mark shaped bands wrapped tightly about a round shaft. Those familiar with the art of such friction hinges will be aware that the torque produced by such bands is lower for one direction of rotation about the shaft, and higher for the other. The torque required to produce rotation in the direction that tends to unwrap the band is lower. For a hinge made with two bands, one connected to each of the two elements being rotatably hinged, and wrapped in the same direction about a common shaft, the torque needed to rotate one band relative to the other will be the lower value for either direction of rotation. This occurs because one of the bands will tend to unwrap for one direction of rotation, while the other band will do so for the second direction of rotation. This arrangement of bands is used in our invention to provide the lower sought-after torque through most of the opening and closing motion of a laptop computer.

However, it is still necessary to provide a higher torque for holding the lid at the two ends of its range of motion: in the open position for viewing, and near the closed position to prevent slamming shut. This is accomplished by adding features to the shaft and bands to limit their relative motions at these positions. So, the band that tends to unwrap as the lid is opened reaches a stop when the lid nears the angle for viewing. Since that band can no longer slip about the shaft, further motion of the lid will force the other band to slip about the shaft. Since this other band tends to wrap down, or tighten about the shaft for that direction of rotation, a higher torque is required to cause slippage. This higher torque holds the lid in position during use.

Similarly, during closing, the other band slips more easily until it reaches its stop on the shaft. Thereafter, further rotation of the lid causes the one band to slip at its higher torque. This prevents the lid from closing too fast.

A device incorporating this type of hinge and a latch to keep it fully closed will exhibit some tendency to pop open when the latch is released because the higher torque at closing will produce some distortion in the tails of the band elements and in the plastic materials of which the cases of such devices are usually made. An optional feature that can be added to the hinge of our invention increases the pop-open action. This is achieved by so arranging the stop features that just before reaching the fully closed position, neither band can rotate further in that direction. Then a still larger torque is required to fully close the lid and engage the latch. Upon opening, the energy stored in the spring material of the bands and the deflection of the case materials is released, lifting the lid a few degrees.

Our hinge has one or more band elements that are firmly connected to the lid of the device to be hinged, and one or more band elements firmly connected to the base of the device. A shaft passes axially through all of the band elements, providing the connection between the lid and the base. In the simplest embodiment, when the assembled device is viewed from an end of the shaft, the band elements are wrapped in the same direction about the shaft. The shaft has stop features which interact with corresponding features on at least some of the bands to limit motion between band and shaft.

For the simplest embodiment having two band and a shaft, the stop feature limits the angle of rotation of each band relative to the shaft, and the total angle through which the hinge can operate is the sum of these two angles plus any slight amount beyond that sum used for the pop-up feature. It is not necessary for the two bands to have equal angles of operation. This flexibility can be used to achieve advantages in design.

It is an object of our invention to provide friction hinges for laptop computers and for other electronic displays and devices whose operation can benefit from differing torque levels during different portions of their relative movement.

It is a further object of our invention to furnish a friction hinge system for laptop computer displays that allows them to move easily from the closed condition toward the operating range of positions and then provides a greater torque for maintaining the angular orientation during operation, while still permitting accurate adjustment.

It is still a further object of our invention to provide friction hinges for electronic displays that are easily moved and yet prevent the display from banging against its latch.

It is also an object of our invention to provide friction hinges for electronic displays that spring open upon release of a latch.

The inventive pop-up friction hinge system accordingly comprises the features of construction, combination of elements, and arrangement of parts which will be exemplified in the constructions described hereinafter, and the scope of the invention will be indicated in the claims.

DETAILED DESCRIPTION OF THE DRAWINGS

Figure 1:
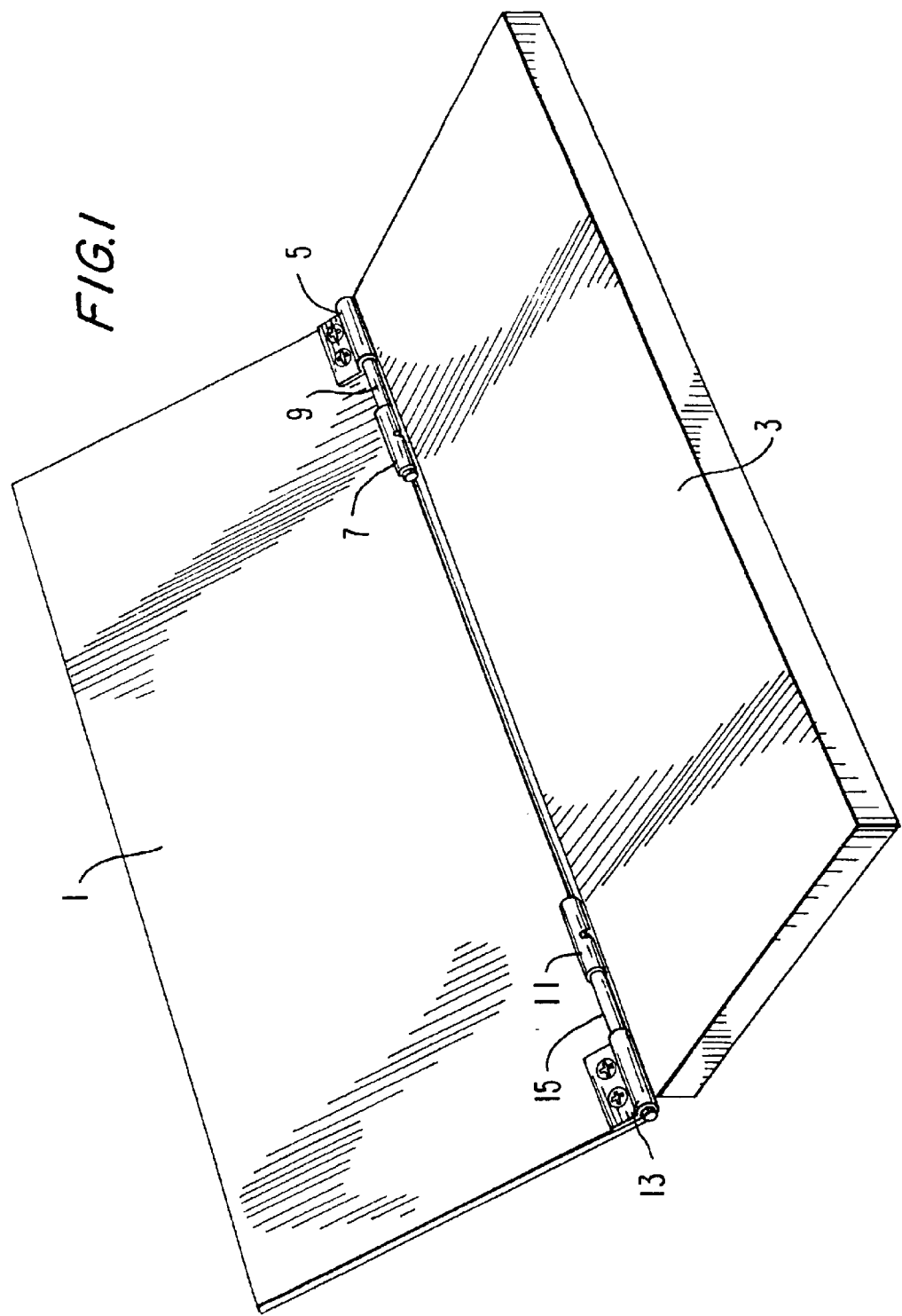
FIG. 1 is a simplified perspective view of a laptop computer, with the screen open and in position for operation, showing the inventive friction hinges while omitting all unnecessary details.

Referring now to FIG. 1, the display 1 of the laptop is pivotally mounted to base 3. Two hinges make the pivotal connection. The right hand hinge is comprised of two bands, 5 and 7, and interconnecting shaft 9. Similarly, the left hand hinge is comprised of bands 11 and 13, which are rotatably wrapped about shaft 15. Each of the four bands is wrapped about its shaft in the same direction. Bands 5 and 13 are fastened to the lid, or display, of the device with screws, as shown if FIG. 1, or by any other convenient means. Similarly, bands 7 and 11 are attached to the base of the device. The axial separation of the bands comprising each hinge is of no significance to the invention. They are shown with considerable separation only for ease of viewing and description.

The range of angular motion of each band with respect to its shaft is limited by a stop means. It is crucial to the invention that this be so. A cut-out in each band is used together with a corresponding pin the its shaft is used. in the embodiments shown. However, any convenient means for limiting the relative motion of each band with respect to its shaft would do as well. Other possible means including formed protrusions on the shafts, slots in the shafts that correspond to protrusions in the bands, external attachments to shafts and bands, and many others that are well known and understood in the art.

Figure 2:
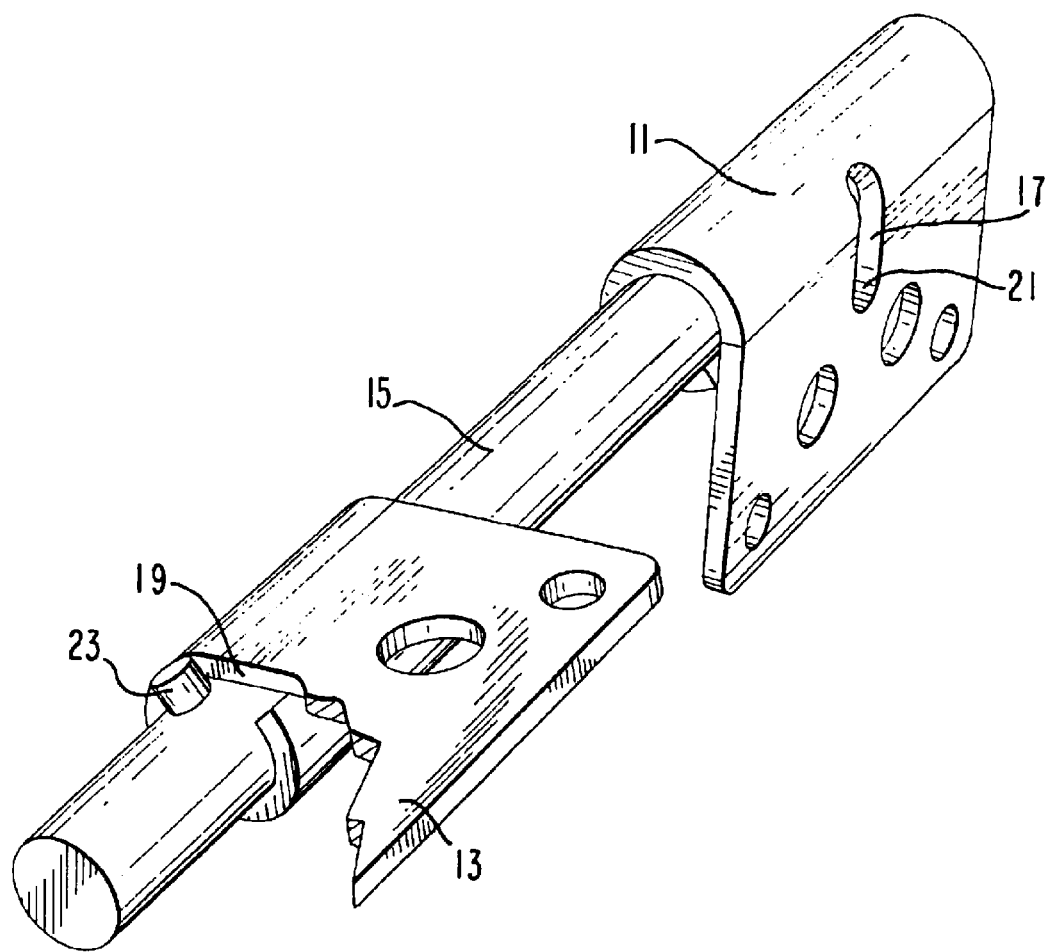
FIG. 2 is a perspective view of the left hand hinge from the laptop with one element of the hinge partially cut away, and with the hinge shown in the orientation corresponding to the closed laptop computer.

In the preferred embodiment of our invention, the stop arrangements are best seen in FIG. 2 which shows the left hand hinge in the orientation it Would have when the device is closed. Band 11 has slot 17, and band 13 has slot 19, only one half of which is visible in FIG. 2 since the rest of the band has been cut-away. These slots can be easily produced as the bands are stamped from flat stock before the circular portions of the bands are formed. Bands 5 and 7 have similar slots. Pins 21 and 23 are pressed into holes in shaft 15. The pins provide the required rotational stops. But they also maintain the axial positioning of the bands along the shaft. Shaft 9 has similar pins.

FIGS. 2 through 6 show the hinge in several positions during the opening of the device. As these are described in what follows, it is to be understood that the same descriptions pertain to the right hand hinge.

Figure 3:
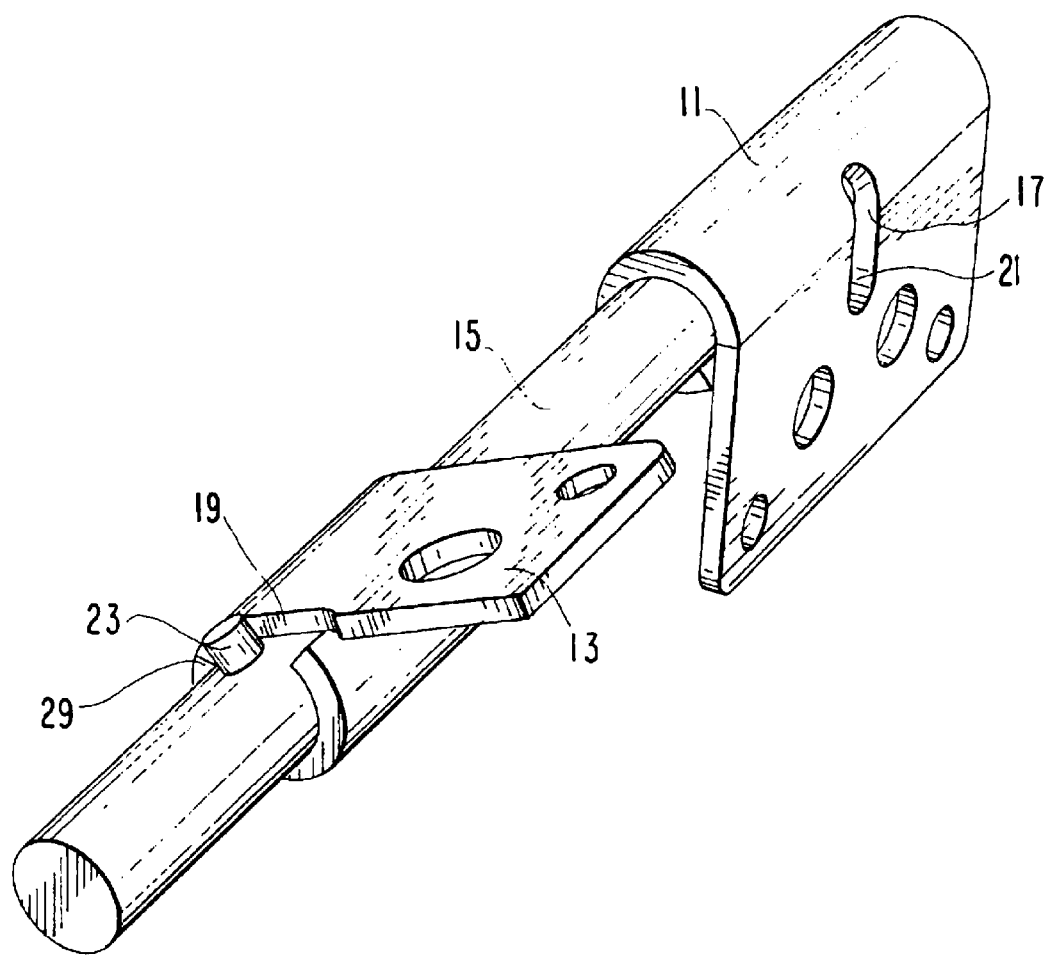
FIG. 3 is another perspective view of the hinge of FIG. 2, but in an orientation corresponding to a slightly opened position of the lid or display of the laptop. The element that is partially cut away in FIG. 2 is also cut away in this view, but the cut away has been simplified for easier viewing.

In FIG. 3, band 13 has slipped around shaft 15 as the lid has been partially lifted. Because the circular portion of band 13 tends to unwrap during this motion, that band slips more easily than band 11 which tends to tighten about shaft 15 for that same motion. Therefore, during this phase of the operation, slot 17 and pin 21 remain as they were in the position of FIG. 2, while slot 19 and pin 23 have moved relative to one another.

Figure 4:
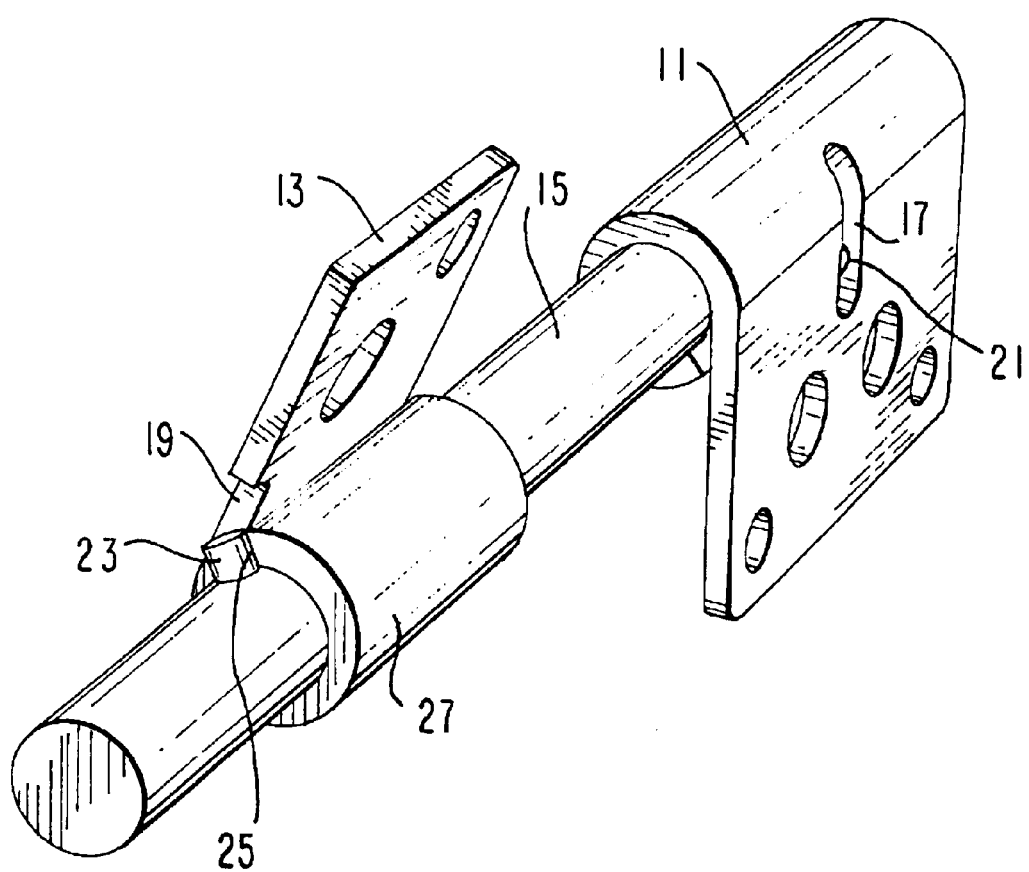
FIG. 4 is a view similar to FIG. 3, but with the hinge positioned as it would be with the lid further opened and approaching the vertical orientation.

FIG. 4 shows the hinge in a position corresponding to a further-opened position of the lid. Tail 25 of band 13 has come into contact with pin 23. Except for a slight further unwrapping of circular portion 27 of band 13 and slight deflection of the flat portion of band 13 and of the lid itself, there can be no further rotation of band 13 about shaft 15.

Figure 5:
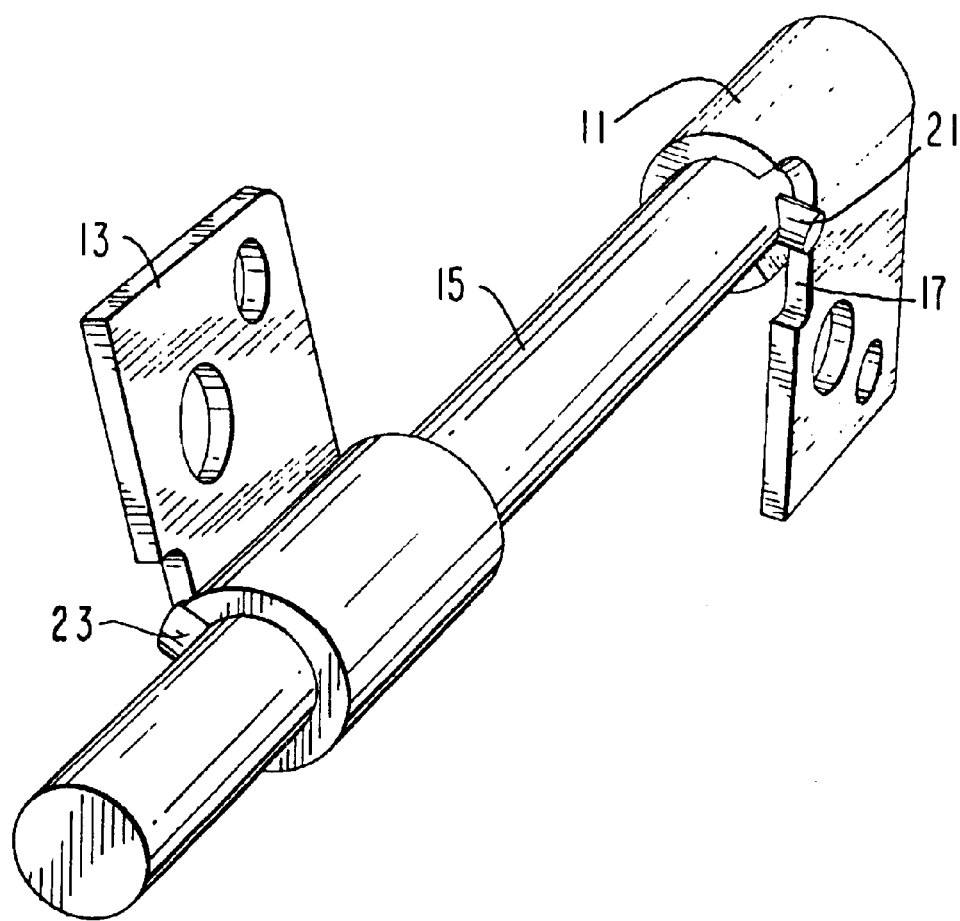
FIG. 5 depicts the same hinge is in the previous three FIGS., but oriented as it would be with the lid just past the vertical position. Both band elements of the hinge have been cut away for better viewing of the stop pins.

Still further opening now requires that there be slippage between shaft 15 and band 11. FIG. 5, in which both bands have been cut away, shows the result of such motion. Pin 21 has rotated within slot 17. To accomplish this movement, it has been necessary for shaft 15 to rotate relative to band 11 in the direction that tends to tighten band 11 about the shaft. This movement requires a higher torque than does rotation of band 11 in the other direction about shaft 15. If bands 13 and 15 have similar torque characteristics for rotation about shaft 15, then, apart from gravitational considerations, this further opening will require the application of a greater torque than was needed to bring the lid into the position of FIG. 4.

In the preferred embodiment of our invention, it is assumed that the four bands of the device of FIG. 1 have the roughly the same torque characteristics. However, for certain design applications, different torque characteristics for the two bands might be desirable. Also, different torque characteristics might be chosen for each of the two or even more hinges of a device. All of these choices would fall within the scope of our invention.

The greater torque level now required to produce continued opening of the lid should be chosen to provide the torque required to keep the lid in the desired position for viewing, once that position has been reached.

Figure 6:
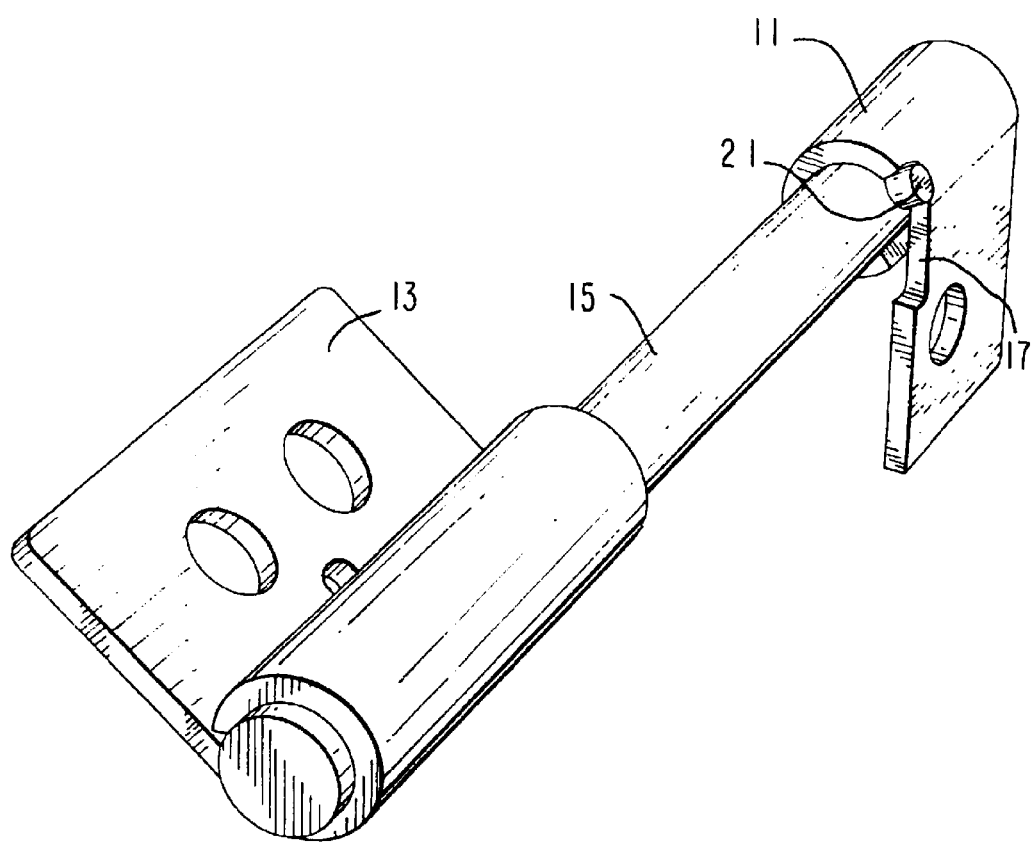
FIG. 6 shows the same hinge in the orientation corresponding to the fully opened position of the display. The right hand band element is cut away.

FIG. 6 shows the left hand hinge in its fully opened position. Pin 21 has reached the end of slot 17. No further rotation of shaft 15 relative to either band can take place. Further motion will result only upon the application of sufficient torque to cause bending somewhere within the overall device. This position can be used when a stop is desired. But it is not necessary to incorporate such a stop position into the design of the hinges. Slot 17 can be further elongated to permit further opening motion. In fact, slot 17 can be continued past the tail of band 11 so that there is no stopping position for the opening direction.

During closing of the lid, the operation begins with the hinge as shown in FIG. 6 and progresses to the position shown in FIG. 5, slippage still occurring between band 11 and shaft 15 because the closing direction tends to unwrap band 11 and tighten band 13.

Further closing brings pin 21 into contact with the end of slot 17, as shown in FIG. 4. Then, except for slight bending somewhere, no further rotation of band 11 relative to shaft 15 can take place. Thereafter, band 13 will have to slip about the shaft, and this will require the higher level of torque corresponding to tightening of band 13 about shaft 15.

This will continue until band 13 has again reached the position shown in FIG. 2 and pin 23 has reached the end of slot 19. This higher level of torque can be chosen to prevent slamming of the lid as it is brought to the fully closed position. If this torque is not the same as the torque required to hold the lid in the viewing position, this dictates different choices for the torque characteristics of the two bands of the hinge by techniques that are well know to those skilled in the art.

The choice of the relative angular orientations for the pins and slots provide the designer with considerable freedom to achieve the desired operating characteristics of the device. The relative orientation of pin 23 and slot 17 determine the angle at which the higher torque level begins during opening. Similarly, during closing, the higher torque level begins according to the relative positions of pin 21 and slot 17. As described above, a stop for opening motion is determined by the position of the end of slot 17.

A skilled designer will recognize that the use of pins to interact with the slots requires additional machining operations and is not the only way to achieve the result. Features can be formed onto the shafts to serve the same function as do the pins. Such forming of the shafts will allow the hinges to be made at a reduced cost. But this will entail additional cost in development construction of tooling which may not be economic for projects that do not have the expectation of long production runs over which to amortize those additional costs.

The location of end 29 of slot 19, best seen in FIG. 3, determines the behavior of the device upon reaching the fully closed position. If pin 23 never contacts end 29 of slot 19 even when the lid is fully closed, then the higher closing torque level described above is never exceeded. But if pin 23 reaches end 29 slightly before the lid is fully closed, then no further slippage will occur and a greater torque will be required from that point. Careful design and fabrication of the parts permits this greater torque level to be achieved for a few degrees of further motion without any breakage or inelastic bending within the unit. This bending can be used to achieve the pop-up action described earlier.

Figure 7:
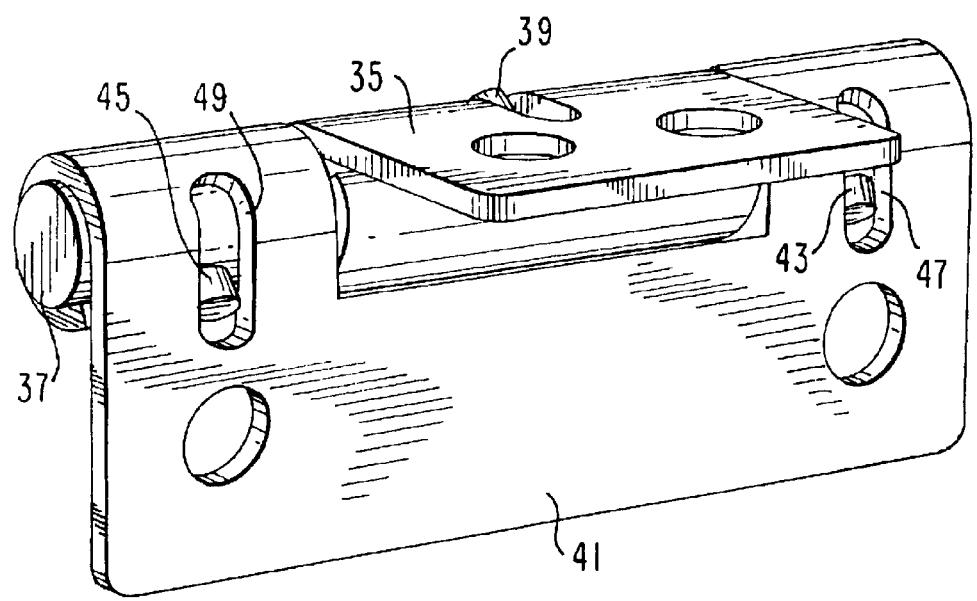
FIG. 7 is a perspective view of an alternative embodiment of the invention.

Many alternative embodiments of our inventive hinge will be obvious to the skilled designer. One such is show in FIG. 7 which has band 35, shaft 37, and pin 39 as does the embodiment already described. Band 41 differs in that it is made more or less in the configuration often used for butt hinges with two circular portions that axially surround band 35. Pins 43 and 45 are pressed into shaft 37 and are positioned within slots 47 and 49 of band 41. Operation is essentially identical with that of the previously described embodiment. One of the two sets of pins and bands could be omitted for band 41, and depending upon the torque levels used, this might operate just as well and save cost.

Still further embodiments of our invention are possible. For instance, these band elements can be incorporated into a housing without departing from the concepts put forth herein. Also, while it is convenient to achieve the differing torque levels with bands wrapped about shafts, there are other ways to achieve the same result namely differing torque levels and stop features to cause the torque levels to change.

It will thus be seen that the objects set forth above among those made apparent from the preceding description, are efficiently attained and, since certain changes may be made in the construction of the inventive friction hinge without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A friction hinge assembly comprising:
   a first element and a second element rotatably connected thereto for enabling the first element to be rotatably disposed at varying angular positions relative to said first element;
   a shaft;
   a first band fixed to said first element and having a spring portion rotatably and frictionally wrapped in a first direction about said shaft for providing a frictional torque therebetween such that said spring portion of such first band tends to loosen in one direction of rotation and tighten in the other direction of rotation;
   a second band fixed to said second element and having a spring portion rotatably and frictionally wrapped in said first direction about said shaft for providing a frictional torque therebetween such that said spring portion of said second band tends to loosen in said other direction of rotation and tighten in said one direction of rotation;
   wherein said spring portion of said first band has a first limited angular range of rotation relative to said shaft in said one direction of rotation and said spring portion of said second band has a second limited angular range of rotation relative to said shaft in said other direction of rotation.

2. The friction hinge assembly of claim 1, further including:
   a first stop for defining said first limited angular range rotation in said one direction such that rotation of said spring portion of said first band about said shaft is prevented following engagement of said first band with said first stop at a first selected rotational position about said shaft.

3. The friction hinge assembly of claim 2, wherein the spring portion of said first band rotatably slips about said shaft in said one direction of rotation at a first level of frictional torque until said first band engages said first stop at said first selected rotational position about said shaft.

4. The friction hinge assembly of claim 2, further including:
   a second stop for defining said second limited angular range of rotation in said other direction such that rotation of said spring portion of said second band about said shaft is prevented following engagement of said second band with said second stop at a second selected rotational position about said shaft.

5. The friction hinge assembly of claim 3, wherein the spring portion of first said second band rotatably slips about said shaft in said one direction of rotation at a second higher level of frictional torque following said engagement of said first band with said first stop.

6. The friction hinge assembly of claim 4, wherein the spring portion of said second band rotatably slips about said shaft in said other direction of rotation at a third level of frictional torque until said second band engages said second stop at said second selected rotational position about shaft.

7. The assembly of claim 4, further including a third stop for preventing further rotation of said second band spring portion relative said shaft in said one rotational direction.

8. The assembly of claim 5, wherein engagement of said first band by said first stop prevents further rotation of said first band spring portion past said first selected rotational position.

9. The friction hinge of claim 6, wherein the spring portion of said first band rotatably slips about said shaft in said other direction of rotation at a fourth higher level of frictional torque following said engagement of said second band with said second stop.

10. The assembly of claim 7, further including a fourth stop for preventing further rotation of said first band spring portion relative said shaft in said other rotational direction.

11. The assembly of claim 8, wherein said first band is formed with a slot for receiving said first stop.

12. The assembly of claim 9, wherein engagement of said second band by said second stop prevents further rotation of said second band spring portion past said second selected rotational position.

13. The assembly of claim 12, wherein second band is formed with a slot for receiving said second stop.

* * * * *